United States Patent [19]

Wiesemeyer

[11] Patent Number: 4,746,160
[45] Date of Patent: May 24, 1988

[54] STREAMLINED TRUCK WITH SEMITRAILER

[76] Inventor: Robert L. Wiesemeyer, Rte. 24, Box 1122, Baldwin, Fla. 32234

[21] Appl. No.: 880,025

[22] Filed: Jun. 30, 1986

[51] Int. Cl.[4] .............................................. B62D 35/00
[52] U.S. Cl. ....................................... 296/1 S; 105/1.1
[58] Field of Search .......................... 296/1 S, 91, 190; 105/2 R, 1.1, 1.2, 1.3; 280/154.5 R

[56] References Cited

U.S. PATENT DOCUMENTS

| | | | |
|---|---|---|---|
| 2,101,793 | 12/1937 | Field, Jr. ............................... | 296/1 S |
| 2,816,794 | 12/1957 | Temp ..................................... | 296/190 |
| 3,711,146 | 1/1973 | Madzsar et al. ........................ | 296/1 S |
| 4,119,339 | 10/1978 | Heimburger ........................... | 296/1 S |
| 4,142,755 | 3/1979 | Keedy .................................... | 296/91 |
| 4,201,415 | 5/1980 | Suchanek ............................... | 296/190 |
| 4,518,188 | 5/1985 | Witten .................................... | 296/91 |

FOREIGN PATENT DOCUMENTS 2808209 8/1979 Fed. Rep. of Germany ...... 296/1 S

Primary Examiner—Robert B. Reeves
Assistant Examiner—Carol L. Olson
Attorney, Agent, or Firm—Arthur G. Yeager

[57] ABSTRACT

Highway truck with semitrailer, with or without a second trailer, with spaces between tractor and semitrailer, and between semitrailer and second trailer covered to provide streamlining and with skirts on both sides extending to immediately above ground level between wheels.

3 Claims, 3 Drawing Sheets

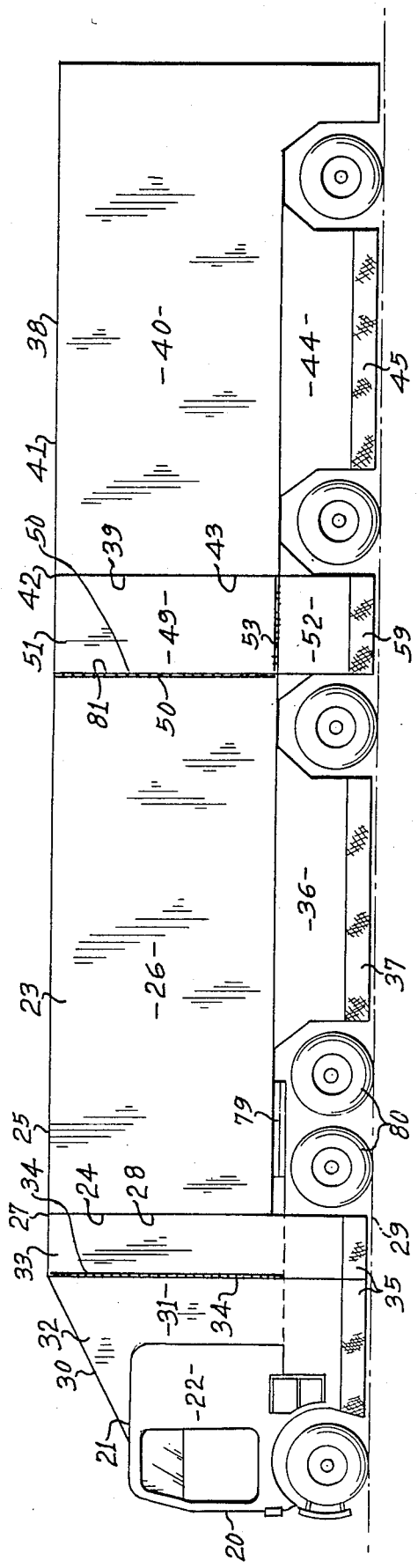
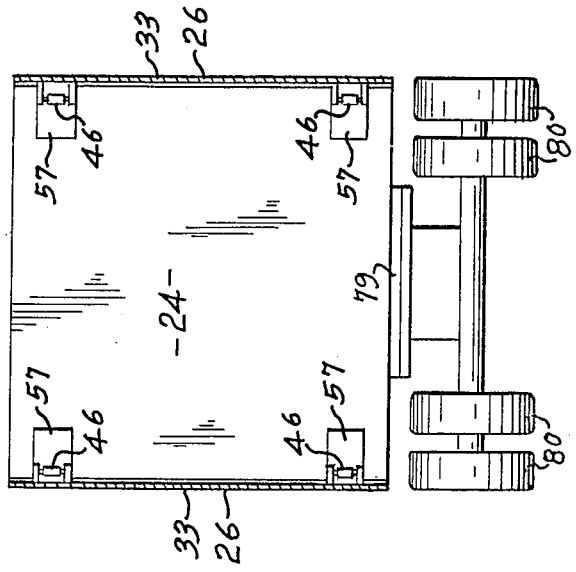
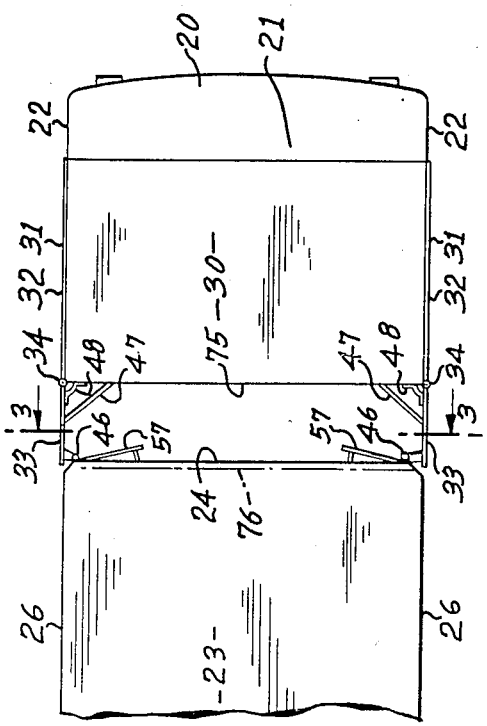

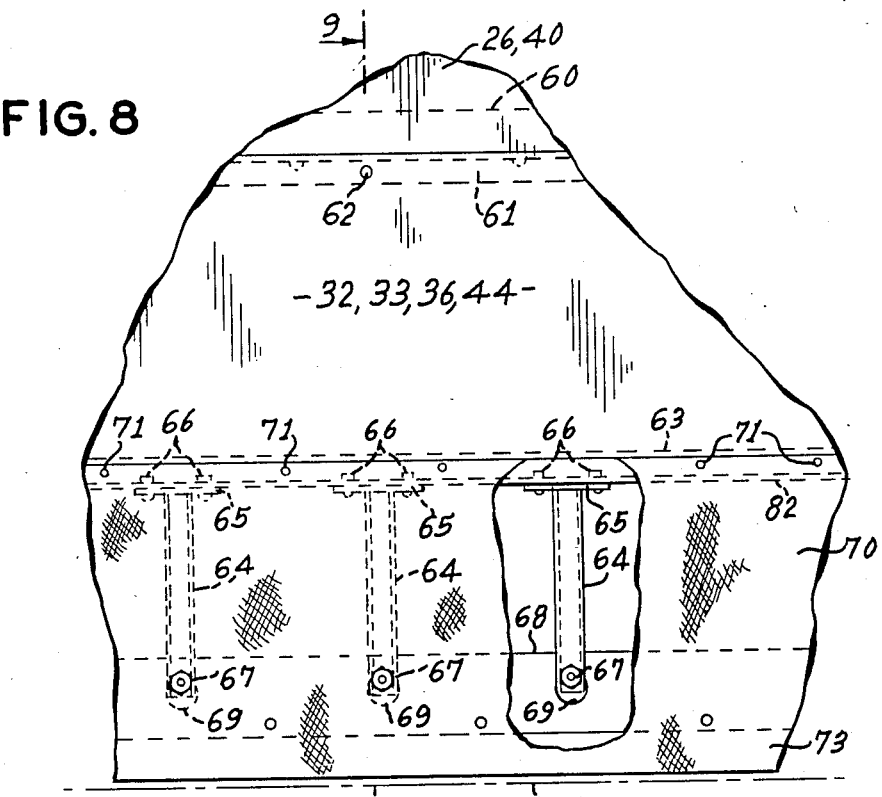
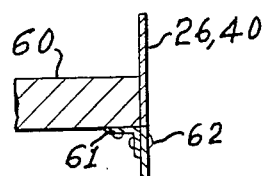
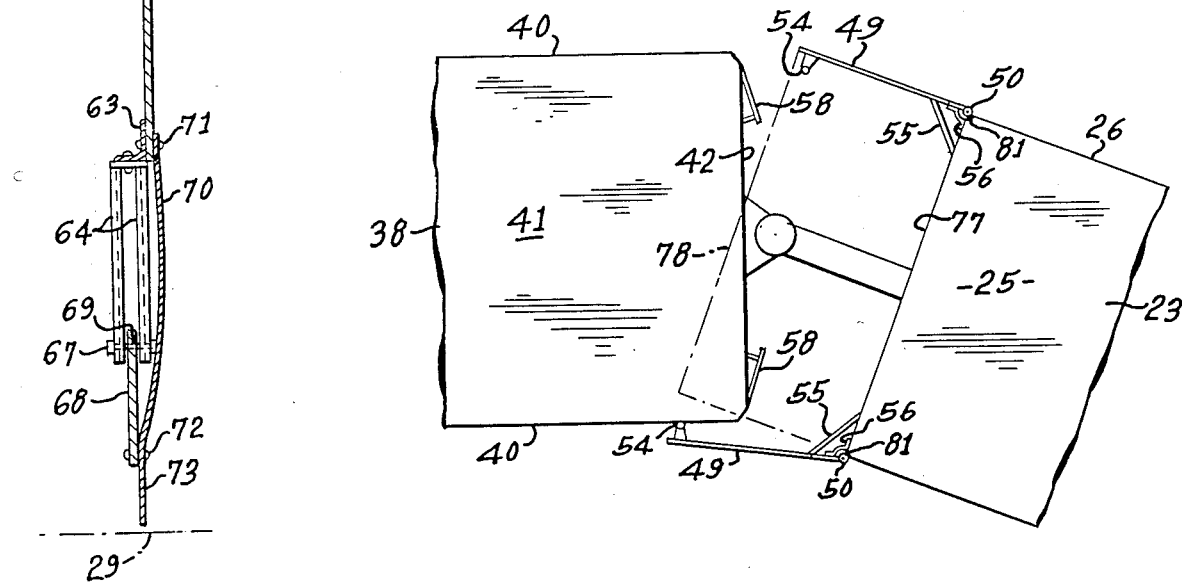

STREAMLINED TRUCK WITH SEMITRAILER

BACKGROUND OF THE INVENTION

Moving freight by highway trucks has been increasing in volume for several years, and it appears that it will continue to increase in the future. This method of freight handling has proved to be more efficient and quicker than any other means in a large majority of situations. Nevertheless, this method has need of further improvement. A large problem is the energy needed to overcome wind resistance. It has been recognized that by streamlining vehicles they can accomplish great savings in fuel expenses and can travel faster. A recent attempt to help solve this problem is the use of a wind deflector attached to the top of the cab of the tractor which provides some streamlining of air flow from the cab to the broad flat or rounded front surface of the semitrailer. Usually, the top of the cab is lower than the top of the semitrailer and this makes the front of the semitrailer react almost like a sail catching the full force of the wind. Eddy currents form behind the cab and behind the semitrailer, and such currents are known to provide great wind resistance to the truck. Furthermore, such eddy currents are produced underneath the truck and its trailers which add to the wind resistance. There is a great need to provide a maximum streamlining effect in order to speed up freight shipments and to reduce shipping costs.

It is an object of this invention to provide an improved streamlined highway truck. It is another object to provide a streamlined highway truck which incorporates a tractor, a semitrailer, and, if desired, a second trailer. Still other objects will become apparent from the more detailed description which follows.

BRIEF SUMMARY OF THE INVENTION

This invention relates to a streamlined highway truck including a tractor with a cab having a roof and two side sections and a semitrailer having a front, a top and two side sections and being pivotally joined by a fifth wheel to said tractor said tractor having a top panel extending from said roof to adjacent the front edge of the top of said semitrailer and two side panels extending from the side sections of said tractor to the front edges of the respective side sections of said semitrailer, said side panels extending vertically from adjacently above ground level to a juncture with said top panel, each of said side panels including a rigid portion connected to the side section of said cab and a vertical strip portion hingedly connected to said rigid portions and adapted to swing outwardly to accommodate an angular relationship of less than 180° between the side panel of the tractor and the adjacent side section of the semitrailer, said strip portions being spring biased to remain aligned with their respective rigid portions, said semitrailer having side panels extending downwardly from the bottom of the side sections to adjacently above ground level from adjacent the tractor wheels under the front of the semitrailer to adjacent the semitrailer wheels adjacent the rear of the semitrailer.

In specific embodiments of this invention the truck includes a trailer towed behind the semitrailer and connector panels between the semitrailer and trailer; and with skirts extending downwardly on both sides to immediately above the ground level between adjacent wheels.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a side elevation of the truck of this invention with a semitrailer and a second trailer;

FIG. 2 is a top plan view of the tractor and the forward portion of the semitrailer;

FIG. 3 is a cross sectional view taken at 3—3 of FIG. 2;

FIG. 7 is a top plan view of the rear portion of the semitrailer and the forward portion of the second trailer at an angle to each other as would be the case when turning;

FIG. 8 is an enlarged partial view in elevation of the skirt portion near ground level; and FIG. 9 is a cross sectional view taken at 9—9 of FIG. 8.

DETAILED DESCRIPTION OF THE INVENTION

Figure 4:
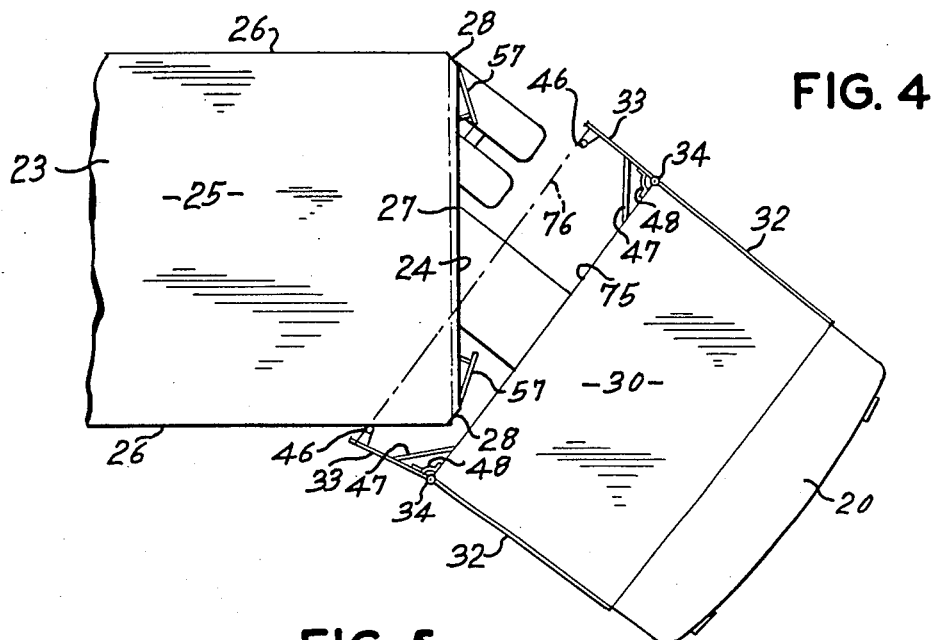
FIG. 4 is a top plan view of the tractor and the forward portion of the semitrailer with the tractor positioned at an angle with respect to the semitrailer as would be the case when turning.

The overall appearance of the invention may best be seen in FIG. 1. The truck of this invention may comprise a tractor 20 and a semitrailer 23 or it may comprise a tractor 20, a semitrailer 23, and a second trailer 38. Generally, no highway truck has more than two trailers as shown, but if more were permitted this invention would be applicable by merely adding behind second trailer 38 tne same features to be described here between semitrailer 23 and second trailer 38.

The streamlining features of this invention involve panels joining tractor 20 to semitrailer 23 and semitrailer 23 to second trailer 38 so as to provide a minimum of sharp corners, flat surfaces, and open pockets to catch the stream of air flowing over a moving vehicle and produce energy consuming wind resistance. In general, except for the wheels, the entire tractor, semitrailer, and second trailer are provided with a smooth continuous outer surface from top to bottom (immediately above ground level).

Tractor 20 comprises a cab for the driver which has a roof or top 21 and two vertical side sections 22. Semitrailer 23 is a rectangular box-shaped vehicle having a flat vertical front 24, a flat horizontal top 25, and two flat vertical sides 26. Front edge 27 of top 25 normally is higher than top 21 of the cab of tractor 20 and, therefore, front 24 forms a large flat surface catching the full force of all wind blowing over top 21. In this invention the space between tractor 20 and semitrailer front 24 is covered with air flow panels to minimize the wind resistance. Top panel 30 extends from tractor top 21 to front edge 27 of top 25 of semitrailer 23. Side panels 31 connect side sections 22 of tractor 20 to the respective front edges 28 of sides 26 of semitrailer 23. If it were not for the joining of tractor 20 and semitrailer 23 by a fifth wheel 79 over the rear wheels 80 of tractor 20 so as to provide a turning facility, panels 30 and 31 could be rigidly fastened both to tractor 20 and semitrailer 23. Because of the jointed turning action provided by fifth wheel 79, panels 30 and 31 are fastened rigidly to tractor 20 but not to semitrailer 23.

Side panels 31 are divided into a rigid immovable portion 32 and a pivotable strip portion 33 joined to each other by an elongated piano hinge 34 extending the entire length of strip portion 33. Skirt portions 35 extend from the bottoms of panel portions 32 and 33 to closely adjacent to ground level 29. The structure and functioning of skirt portions 35 are described below with reference to FIGS. 8 and 9.

Between semitrailer 23 and second trailer 38 are vertical connector panels 49 aerodynamically joining sides 26 of semitrailer 23 to sides 40 of second trailer 38. Panels 49 are attached to rear edges 81 of sides 26 by hinges 50 so as to provide a swinging action to panels 49 to accommodate the angular relationship between semitrailer 23 and second trailer 38 when the truck is turning.

In FIGS. 2-4 there are shown the features of the panels connecting tractor 20 to semitrailer 23. Side panels 31 and top panel 30 are affixed to appropriate and convenient locations on side sections 22 and roof 21 of tractor 20 by welding, riveting, or the like with each juncture being smoothed to provide the smoothest connection possible. Panels 30 and 31 are then directed smoothly toward edges 27 an 28 respectively to provide the optimum in streamlining. Generally, this can be achieved by making top panel 30 incline upward to the higher elevation of front edge 27 and side panels 31 to extend rearwardly in a planar fashion to front edges 28. Panel 30 is joined at each side respectively to panels 31 along straight or gently curved lines to make a three-sided enclosure extending rearwardly from the cab of tractor 20 to the front wall 24 of semitrailer 23. Top panel 30 may take either of two form which differ only in the positional relationship of the rear edge of panel 30 to front edge 27. It is advantageous in some instances to leave an open space between rear edge 75 of panel 30 and front edge 27 to provide ventilation therein. This is particularly important if the exhaust is in this area. If, however, the exhaust does not discharge in this area, panel 30 may extend to edge 76 (in dotted lines) slightly overlapping front edge 27. This latter alternative is preferred in order to achieve maximum streamlining. Panel 30 is supported on any convenient framework projecting outwardly from the surfaces of the cab of tractor 20. Such framework is not shown here because it is considered to be conventional.

When the truck must turn it pivots around fifth wheel 79 (FIG. 1) which would cause the side panel 31 on the inside of the turn to be damaged if it were not for making that panel in two hinged portions. Rigid portion 32 is joined to strip portion 33 by hinge 34. Portion 33 has affixed to its inside surfaces stop bracket means 47 which prevent it from swinging inwardly beyond its normal position when tractor 20 is aligned with semitrailer 23 as shown in FIG. 2. Springs 48 or other equivalent biasing means urge portion 33 toward its stop position against bracket 47. At the outer extremities of strip portion 33 is a plurality of rollers 46 affixed on the inside surface of portions 33 and spaced inwardly therefrom by any suitable bracket support means. Cooperating with rollers 46 are roller tracks 57 rigidly attached to front wall 24 of semitrailer 23, one track 57 for each roller 46. Tracks 57 are plates set at an inclined angle sloping away from wall 24 as the track extends inwardly away from front edge 28. Front edge 28 meets track 57 smoothly so that roller 46 may roll on track 57 and around front edge 28 to side section 26 smoothly. It will be seen in FIG. 4 how portion 33 on the inside of the turn pivots outwardly as roller 46 rolls off track 57 around edge 28 and onto side section 26. On the outside of the turn the respective portion 33 remains in line by reason of stop bracket 47 and roller 46 is removed completely from contact with track 57 or any part of semitrailer 23. However, when tractor 20 returns to the aligned position roller 46 will return to track 57 as shown in FIG. 2. And, of course, if tractor 20 turns in the opposite direction from that shown in FIG. 4, the portions 33, rollers 46 and tracks 57 will function in reverse to that shown in FIG. 4. Portions 33 are capable of handling the sharpest turns possible. FIG. 3 shows four sets of rollers 46 and tracks 57 positioned generally at the four corners of frong wall 24. It is preferable to have at least these four sets, and it may be desirable in some embodiments of this invention to employ more than four sets. It is, of course, possible to employ only one set per portion 33 if all components are made sufficiently stiff, but that is not preferred since it would probably require added weight to provide the necessary stiffness.

Figure 5:
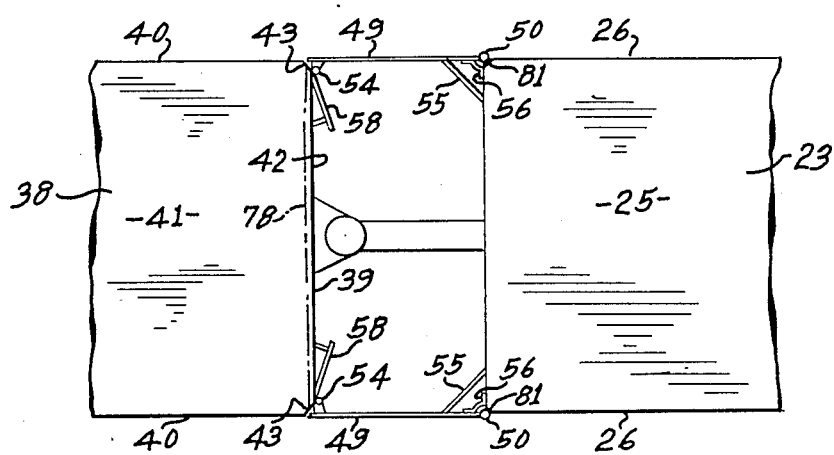
FIG. 5 is a top plan view of the rear portion of the semitrailer and the forward portion of the second trailer.
Figure 6:
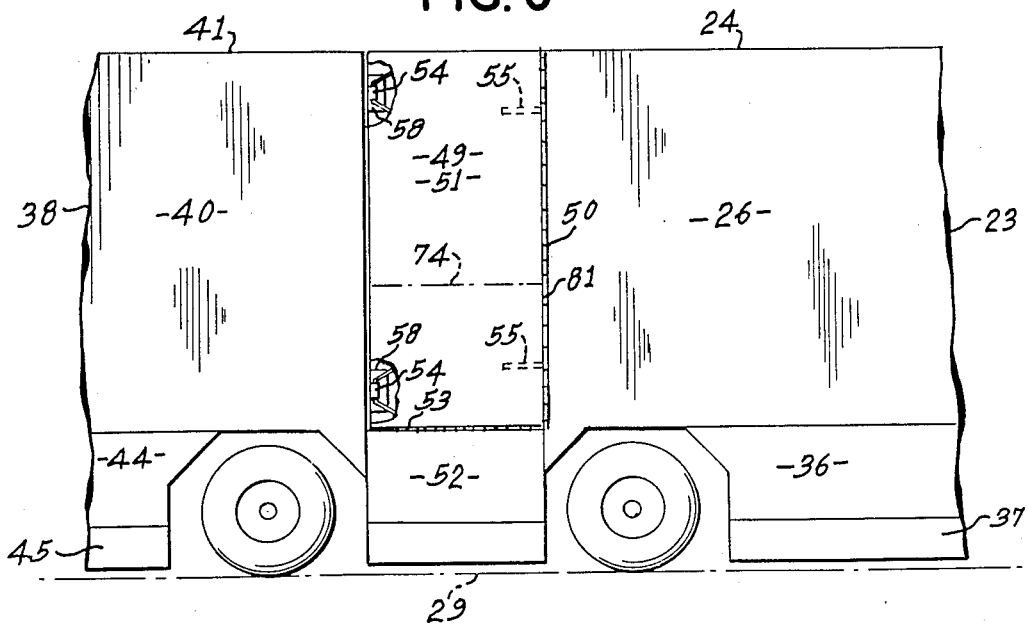
FIG. 6 is a side elevational view of the illustration of FIG. 5.

In FIGS. 5-7 there are shown the features required when the truck includes a second trailer 38 towed behind semitrailer 23 as is popular for many long hauls. The space between semitrailer 23 and second trailer 38 is enclosed by two side connector panels 49, and, if desired, a top connector panel extending from rear edge 77 of top 25 of semitrailer to front edge 42 of top 40 of second trailer 38, or slightly overlapping front edge 42. The rear edge of such a top panel is shown in dotted lines at 78. Side connector panels 49 are attached to the rear of semitrailer 23 in the same fashion as strip portions 33 are attached to rigid portions 32 as described above for the space between tractor 20 and semitrailer 23. Connector panels 49 extend from tops 24 and 41 to adjacently above ground level 29. Each panel 49 has an upper portion 51 and a lower portion 52 joined along a horizontal hinge 53 which permits lower portion 52 to be folded upwardly over the outside of upper portion 51 such that the lower edge of lower portion 52 would be along line 74 (dotted lines in FIG. 6) when folded upwardly. Upper portion 51 is connected to rear edges 81 of side sections 26 by hinges 50. Stop brackets 55 and springs 56 keep panel 49 from swinging inwardly and do not permit panel to swing freely outwardly, but do permit outward pivoting when necessitated by the truck negotiating a curve. It will be seen in FIGS. 5-7 that the normal alignment between side section 26 and panel 49 is 180° alignment but that when a turn is made (as shown in FIG. 7) panel 49 on the inside of the turn assumes an angle of less than 180° by pivoting and overlapping side section 40 of second trailer 38. On the outside of the turn the respective panel 49 maintains its alignment with side section 26 by reason of spring 56 and stop bracket 55. Rollers 54 cooperate with roller tracks 58 in exactly the same manner as described previously for rollers 46 and roller tracks 57. When semitrailer 28 is to be loaded or unloaded panels 49 may be unhooked from springs 56 and swung outwardly against side sections 26 to give free access to the rear door of semitrailer 23.

Each of semitrailer 23 and second trailer 38 are provided with side panels 36 and 44 respectively which extend from the truck bed downwardly to adjacent to ground level 29, and extend forward and rearward to cover the space between the front and rear wheels. In the case of semitrailer 23 the wheels under the forward portion are actually rear wheels 80 of tractor 20.

Along the lower portion of all of side panels 32, 33, 36, 44, and 49 are skirt portions 35, 37, 45, and 59 respectively. All of these skirt portions are identical in structure. They are made to ride as close to ground level 29 as possible, but also to be able to negotiate bumps, obstructions in the roadway, and sharp changes in elevation. The structure of these skirt portions is shown in FIGS. 8 and 9. In FIG. 8 there is shown a representative panel 32, 33, 36, and 44. In the case of panels 36 and 44 they depend from semitrailer 23 or second trailer 38. In each instance side sections 26 and 40 terminate at trailer bed 60. In order to attach a streamlining panel below bed 60 a length of angle beam 61 may be bolted, welded, riveted, or otherwise attached thereto and panel 36 or 44 hung therefrom by bolts, rivets, or other fasteners 60. Panels 32 and 33 are attached at any convenient place to the cab or other structure of tractor 20 and may or may not have a supporting structure like angle beam 61 and fastener 62. Along the bottom edge 82 of panels 32, 33, 36, and 44 is fastened an angle beam 63 by means of fasteners 71. Depending downwardly from angle beam 63 at horizontally spaced intervals are support brackets 64, which may be channel beams, angle beams, plates, strips, or the like fastened at their top ends by means of flanges 65 to angle beam 63 by bolts, rivets, or other fasteners 66. At the lower end of brackets 64 is a lateral pin 67 from which hangs backing plate 68 by means of holes 69 through which pass pins 67. Holes 69 are considerably larger than pins 67 so as to provide a substantial amount of movement or play around pins 67. A flexible fabric skirt is attached at its upper edge to the bottom of panels 32, 33, 36 and 44, and near its lower edge to the bottom of backing plate 68 by means of fasteners 72. A lower portion 73 of fabric 70 extends below the bottom of plate 68 to adjacent ground level 29. It may be seen that if plate 68 encounters any obstruction which is above ground level 29, plate will move upward due to the play around pins 67 and fabric 70 will merely flex outward. When past the obstruction, gravity will cause plate 68 to seek its lowest level and fabric 70 will return to its normal unflexed position. Of course, any large obstructions cannot be negotiated by this structure, but such are not expected to be encountered on superhighways where the trucks of this invention are expected to travel.

The materials used to make the structure of this invention cover a wide variety of types. It is only important that they be as durable and as light as possible and yet be strong enough to serve their purposes. Iron, steel, aluminum, plastic, etc. may be employed except for fabric 70 which may be cotton, nylon, wire mesh, etc.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to be secured by Letters Patent of the United States is:

1. A streamlined highway truck including a tractor with a cab having a roof and two side sections, a semitrailer having a front, a top and two side sections and being pivotally joined by a fifth wheel to said tractor, and a second trailer having a front, a top, and two side sections and being attached to the rear of said semitrailer; said tractor having a top panel extending from said roof to adjacent the front edge of the top of said semitrailer and two side panels extending from the side sections of said cab to the side sections of said semitrailer, said side panels extending vertically from adjacently above ground level to a juncture with said top panel, each of said side panels including a rigid portion connected to the side section of said cab and a vertical strip portion hingedly connected to said rigid portion and adapted to swing outwardly to accommodate an angular relationship of less than 180° between the side panel of the tractor and the adjacent side section of the semitrailer, said strip portions, being spring biased to remain aligned with their respective rigid portions, said semitrailer having side panels extending downwardly from the bottom of the side sections to adjacently above ground level from adjacent the tractor wheels under the front of the semitrailer to adjacent the semitrailer wheels adjacent the rear of the semitrailer; two connector panels hingedly attached to the rear vertical edges of the respective side sections of said semitrailer and extending rearwardly to the front edges of the respective side sections of said trailer from the top of said side sections to adjacently above ground level, said connector panels being adapted to swing outwardly to accommodate an angular relationship of less than 180° between adjacent side sections of the semitrailer and the trailer respectively, and being spring biased to remain aligned with the respective side sections of said semitrailer to which they are attached; said connector panels having an upper portion and a lower portion, said upper portion extending from the top of said semitrailer to the bed of said semitrailer, and said lower portion extending from the bed of said semitrailer to adjacently above the ground level, said upper and lower portions being hingedly connected to each other along a horizontal line with said lower portion adapted to swing upward and lie flat against the outside of said upper portion.

2. The truck of claim 1 wherein each of said side panels which extends to adjacently above the ground level includes a lower horizontal portion attached to an upper rigid portion, said lower horizontal portion being vertically movable with respect to said upper rigid portion and includes a flexible fabric covering the juncture between said upper and lower portions and being attached to both said portions and adapted to accommodate itself to cover the juncture in all relative positions of said portions, said lower portion being biased by gravity to hang below and aligned with said upper portion.

3. The truck of claim 2 wherein said lower horizontal portion is rigid and contains a plurality of horizontally spaced passageways therethrough to accommodate a plurality of pins attached to said upper portion and passing through said passageways, said passageways being sufficiently larger in cross section than the cross section of each said pin to provide movement to said lower portion with respect to said upper portion, said lower portion being suspended on said pins by gravity.

* * * * *